United States Patent
Jang et al.

(10) Patent No.: US 7,265,650 B2
(45) Date of Patent: Sep. 4, 2007

(54) POWER FACTOR CORRECTION RECTIFIER HAVING INDEPENDENT INDUCTIVE COMPONENTS

(75) Inventors: Yungtaek Jang, Cary, NC (US); Milan Jovanovic, Cary, NC (US)

(73) Assignee: Delta Electronics, Inc., Neihu (TW)

( * ) Notice: Subject to any disclaimer, the term of this patent is extended or adjusted under 35 U.S.C. 154(b) by 0 days.

(21) Appl. No.: 11/355,972

(22) Filed: Feb. 17, 2006

(65) Prior Publication Data

US 2007/0040644 A1 Feb. 22, 2007

Related U.S. Application Data

(63) Continuation-in-part of application No. 11/062,446, filed on Feb. 22, 2005, now Pat. No. 7,161,458.

(51) Int. Cl.
H01F 27/24 (2006.01)
G05F 1/24 (2006.01)
G05B 24/02 (2006.01)

(52) U.S. Cl. .............. 336/212; 336/220; 323/259; 323/344

(58) Field of Classification Search .......... 336/212, 336/220, 221–222; 323/344, 355, 207, 259
See application file for complete search history.

(56) References Cited

U.S. PATENT DOCUMENTS

| | | | | |
|---|---|---|---|---|
| 6,069,801 A | * | 5/2000 | Hodge et al. | 363/21.02 |
| 6,388,397 B1 | * | 5/2002 | Iwahori | 315/307 |
| 7,109,659 B2 | * | 9/2006 | Kamoi | 315/88 |

OTHER PUBLICATIONS

Ferrari de Souze et al., "High Power Factor Rectifier with Reduced Conduction and Commutation Losses", no dated.
Emö et al., "Second Generation of PFC Solutions", Power Electronics Europe, Issue 7, pp. 33-35 (2004).
Frisch et al. "$2^{nd}$ Generation of PFC Solutions", no dated.
Y. Jang and R. W. Erickson, "New Quasi-Square Wave and Multi-Resonant Integrated Magnetic Zero Voltage Switching Converters," *IEEE Power Electronics Specialists Conf. (PESC) Proc.*, pp. 721-727, 1993.
A. Pietkiewicz and D. Tollik, "Coupled-Inductor Current-Doubler Topology in Phase-Shifted Full-Bridge Dc—Dc Converter," *IEEE Applied Power Electronics Conf. (APEC) Proc.*, pp. 273-279, 2001.

(Continued)

Primary Examiner—Anh Mai
(74) Attorney, Agent, or Firm—Venable LLP; Robert S. Babayi

(57) ABSTRACT

A PFC circuit comprises a first converter and a second converter and a multi-port electromagnetic device. The first converter has a first inductive element and the second converter has a second inductive element. The multi-port electromagnetic device comprises a first magnetic core having a first closed flux path and a second magnetic core having a second closed flux path, with the first closed flux path being independent of the second closed flux path. The first inductive element of the first boost circuit comprises a first winding that electromagnetically couples the first magnetic core to the second magnetic core and the second inductive element of the second boost circuit comprises a second winding that electromagnetically couples the first magnetic core to the second magnetic core independent of the electromagnetic coupling of the first winding such that current application in one windings does not induce a substantial voltage in the other.

9 Claims, 27 Drawing Sheets

OTHER PUBLICATIONS

P.L. Wong, Q. Wu, P.X. Xu, B. Yang, and F.C. Lee, "Investigating Coupling Inductors in the Interleaving QSW VRM," *IEEE Applied Power Electronics Conf. (APEC) Proc.*, pp. 973-978, 2000.

I.D. Jitaru, "High Efficiency Flyback Converter Using Synchronous Rectification," *IEEE Applied Power Electronics Conf. (APEC) Proc.*, pp. 867-871, 2002.

\* cited by examiner

US 7,265,650 B2

POWER FACTOR CORRECTION RECTIFIER HAVING INDEPENDENT INDUCTIVE COMPONENTS

RELATED APPLICATIONS

This application is continuation-in-part of patent application Ser. No. 11/062,446, filed on Feb. 22, 2005, now U.S. Pat. No. 7,161,458, which is hereby incorporated by reference in its entirety.

BACKGROUND OF THE INVENTION

1. Field of the Invention

This invention relates to power factor correction (PFC) front-end rectifier, and more particularly to a PFC rectifier that has independently coupled inductive components.

2. Description of the Prior Art

Electromagnetic devices have been used in a wide variety of power supply applications. These devices generally comprise a magnetic core and one or more windings. Some power supplies use multiple electromagnetic devices at various stages of their power conversion circuitry. Conventionally, magnetic cores of the multiple electromagnetic devices has been integrated to increase the power density and decrease the component count of power supplies.

Known power conversion circuitry have used an integrated magnetic core to achieve magnetic coupling between two filter inductors. An integrated magnetic core is also used for magnetically coupling a filter inductor and a resonant inductor. In these known approaches, however, the voltage waveforms across the magnetically coupled inductors are proportional to each other.

In some applications, it is desired that the voltage waveforms across the windings not to be proportional. FIG. 1 shows a known multi-port electromagnetic device that couples two windings in this manner. However, under this arrangement, one winding of the multi-port electromagnetic device of FIG. 1 is significantly influenced by the applied voltage across the other winding. In other words, the two windings of the multi-port electromagnetic device of FIG. 1 are dependent on each other because of their mutual inductance.

In some applications, it is necessary to provide a multi-port electromagnetic device having independent windings. For example, in power supplies that have multiple converter stages, the inductive components in one stage should be independent of each other. This requirement makes the multi-port electromagnetic device of FIG. 1 unsuitable because of its dependent inductive components.

One known approach that provides independent inductive components uses an orthogonal magnetic flux, whereby an induced magnetic flux in one winding is perpendicular to the magnetic flux induced in another winding. As a result, the two windings could be wound on the same magnetic core, while behaving as independent inductors. However, the structure of the windings on the magnetic core for creating orthogonal magnetic flux is too complex.

FIG. 2 shown another known multi-port electromagnetic device that uses a pair of E-shaped magnetic cores with symmetrical and asymmetrical windings to provide independent inductive components. However, in the multi-port electromagnetic device of FIG. 2, the reluctances of the two outer legs of the E core must be identical, otherwise the magnetic flux generated by the winding on the middle leg is not equally distributed to the outer legs. As a result, the induced voltage across the windings of the outer legs are significantly influenced by the voltage across the winding on the inner leg, which causes the two windings not to be magnetically independent of each other.

In a co-pending patent application Ser. No. 11/062,446, which is assigned to the assignee of the present invention and is hereby incorporated by reference in its entirety, the inventors of the instant application disclosed an "Electromagnetic Device Having Independent Inductive Components." The disclosed electromagnetic device includes two groups of windings, with each group of windings storing decoupled magnetic energy in commonly used magnetic cores, i.e., the two groups of windings are magnetically independent. Each group of windings consists of at least one winding. For example, to obtain two independent inductors, a single winding from each group is required, as further described below.

PFC rectifiers in the front-end of a power supply draw an ac input current from an ac input voltage source to meet harmonic standards for power supplies by reducing harmonic contents of input current waveforms. PFC front-end rectifiers in general employ one or more boost converters, which have corresponding inductive components. One conventionally employed technique for correcting power factor uses a front-end full bridge rectifier followed by a boost converter. Also known is a PFC rectifier that eliminates two of the four input bridge diodes located in the series power path of the PFC rectifier. FIG. 3 shows one such PFC rectifier, which uses two boost converters to achieve high power factor with two input diodes. Each boost converter is connected to the ac input source in opposite polarity and operates during one half line cycle of the ac input voltage. As shown in FIG. 3, a first boost converter is connected to a first terminal of the ac input voltage source and a second boost converter is connected to a second terminal of the ac input voltage source. Each boost converter operates during one half line cycle of the ac input voltage. As shown in FIGS. 4 and 5, one boost converter operates while the other boost converter is idle (shown in dotted lines). As a result, the utilization of switches and inductive components is only one half of the conventional PFC boost converter that always utilizes all the components during the entire line cycle. The low utilization of the inductive components may be a serious penalty in terms of size, weight and power density of the power supply.

Therefore, there exists a need for a PFC rectifier that utilizes its inductive components more efficiently to overcomes the above mentioned drawbacks.

SUMMARY OF THE INVENTION

Briefly, according to the present invention, a PFC circuit comprises a first converter, which may be a boost converter, and a second converter (which may be a boost or buck converter) and a multi-port electromagnetic device. The first converter has a first inductive element and the second converter has a second inductive element. The multi-port electromagnetic device comprises a first magnetic core having a first closed flux path and a second magnetic core having a second closed flux path, with the first closed flux path being independent of the second closed flux path. The first inductive element comprises a first winding that electromagnetically couples the first magnetic core to the second magnetic core and the second inductive element comprises a second winding that electromagnetically couples the first magnetic core to the second magnetic core independent of the electromagnetic coupling of the first winding such that current application in one windings does not induce a substantial voltage in the other. Preferably, the winding direction of one of the first winding or the second winding on one of the first magnetic core or second magnetic core is opposite to winding direction of the other one of the first winding or the second winding on the same one of the first magnetic core or second magnetic core.

According to some of the more detailed features of the present invention, the first winding electromagnetically couples the first magnetic core to the second magnetic core serially. Similarly, the second winding electromagnetically couples the first magnetic core to the second magnetic core serially. In an alternative embodiment, the first winding electromagnetically couples the first magnetic core to the second magnetic core serially, but the second winding electromagnetically couples the first magnetic core to the second magnetic core in parallel. The first and second magnetic cores could have identical or different shapes. In an exemplary embedment, at least one of the first magnetic core and second magnetic core comprise toroidal magnetic core.

DETAILED DESCRIPTION OF THE INVENTION

Figure 1:
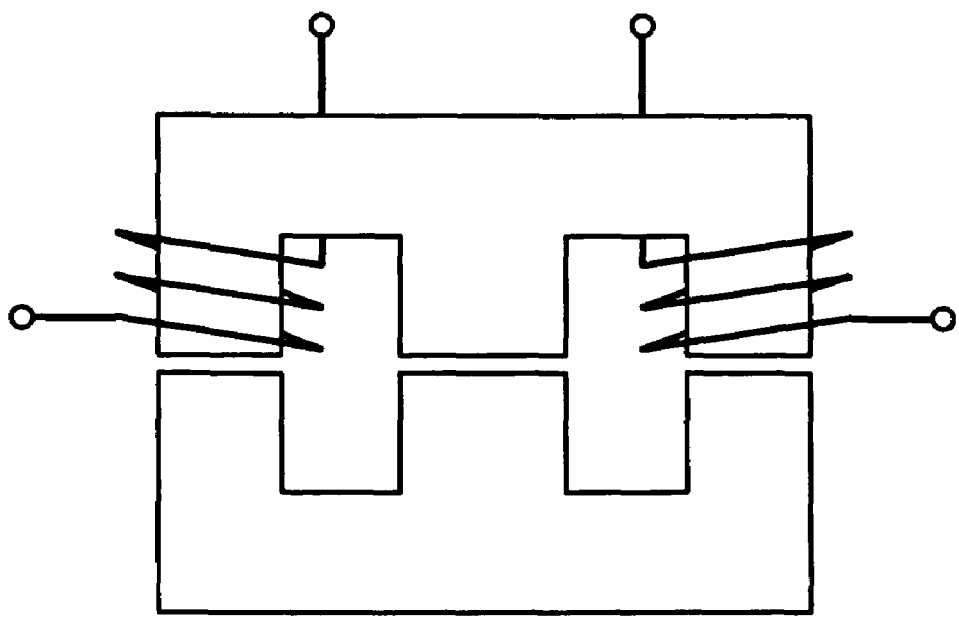
FIG. 1 shows a prior art multi-port electromagnetic device.
Figure 2:
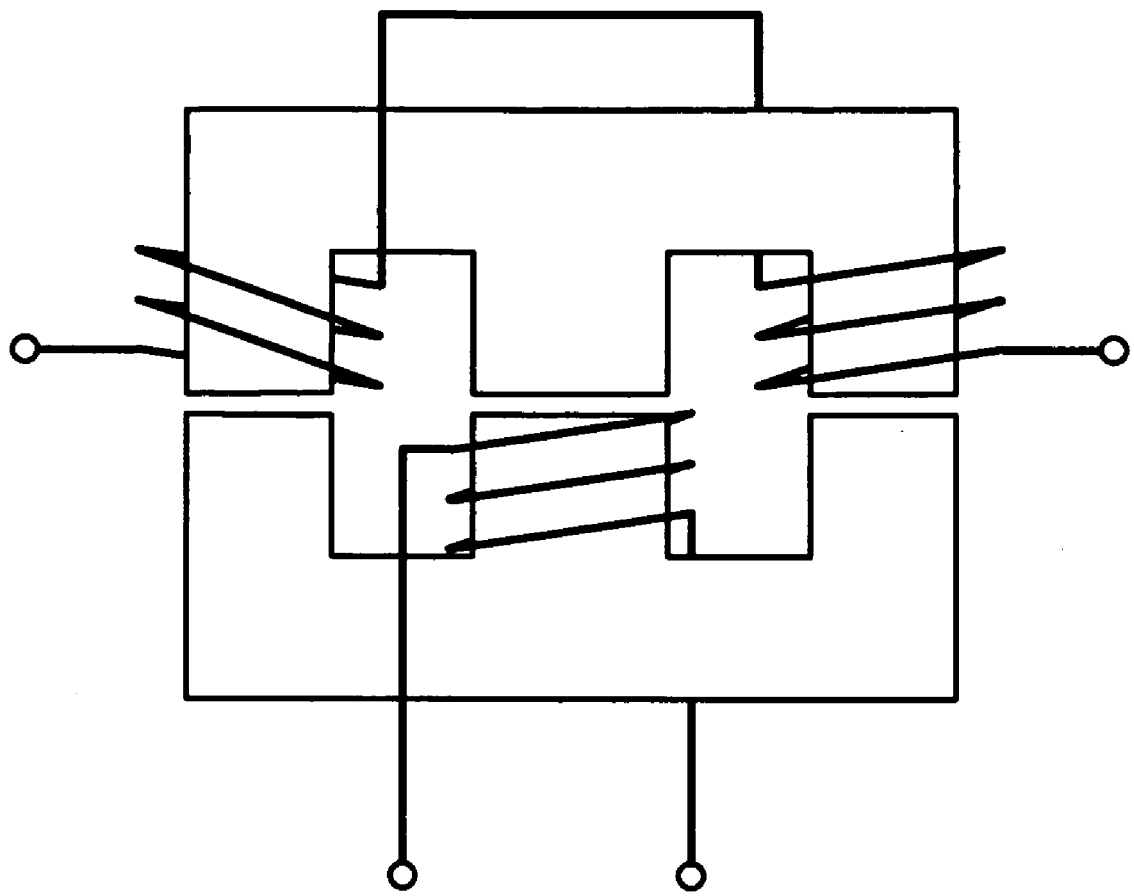
FIG. 2 shows another prior art multi-port electromagnetic device.
Figure 3:
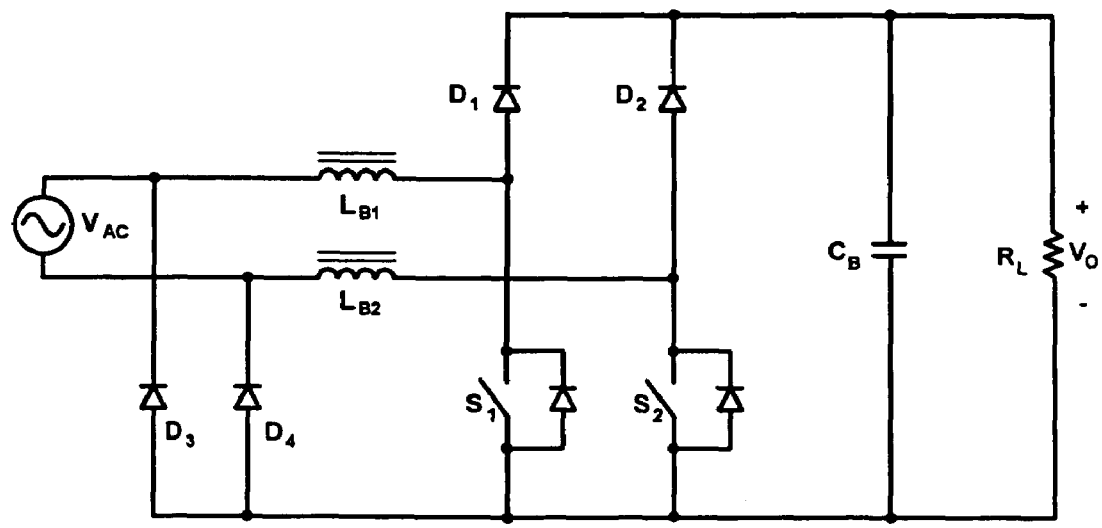
FIG. 3 shows a conventional PFC rectifier having two boost converters.
Figure 4:
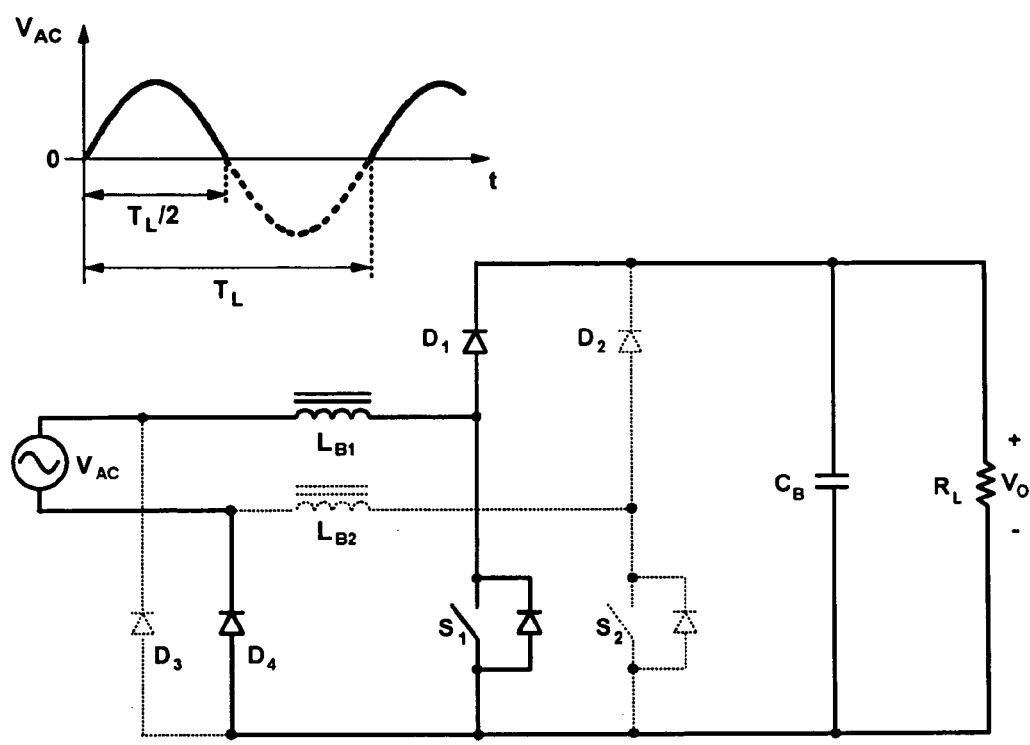
FIG. 4 highlights the operation of the PFC rectifier of FIG. 3 during the period when the line voltage is positive.
Figure 5:
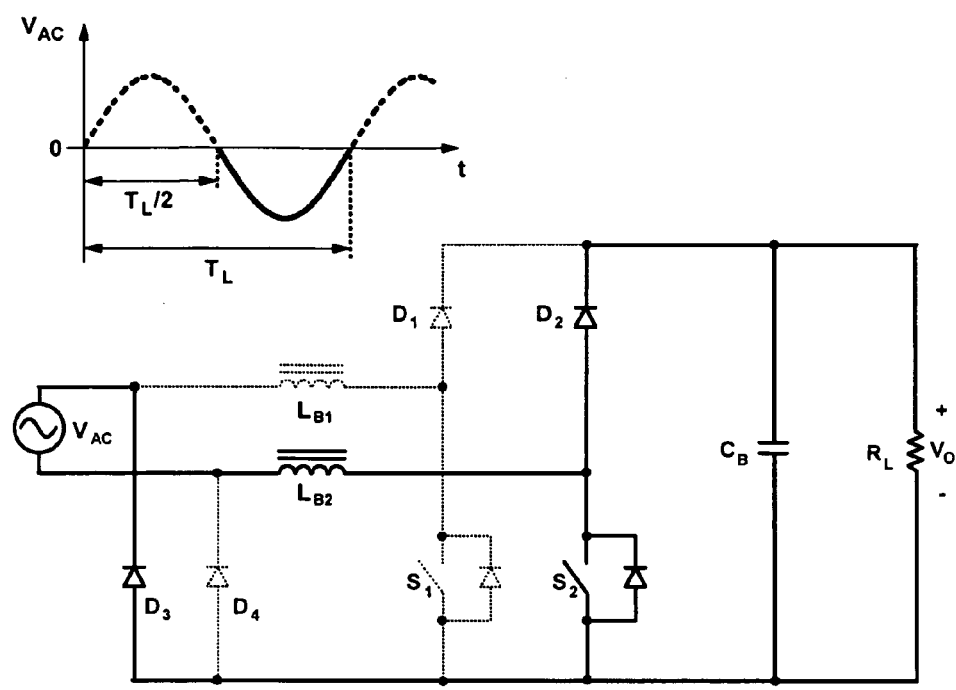
FIG. 5 shows highlights the operation of the PFC rectifier of FIG. 3 during the period when the line voltage is negative.

According to the present invention, a PFC rectifier employs magnetically independent windings of a multi-port device to increase the utilization of the magnetic core. More specifically, the PFC rectifier includes at least two converters each having a corresponding inductive component. In one embodiment, the two converters comprise boost converters, each being active during one half line cycle of an ac input voltage. The inductive components of the boost converters comprise magnetically independent windings of the multi-port electromagnetic device. The multi-port magnetic device has two magnetically independent first and second magnetic cores, which are coupled to each other via the two windings. The windings store decoupled magnetic energy in the first and second magnetic cores such that the two of windings are magnetically independent of each other. In one embodiment, one half of the winding turns is wound on the first core and the other half is wound on the second core. In addition, winding directions on the first core for the two windings are be the same, while winding directions on the second core for the two windings are opposite of each other. As a result, the magnetic cores are commonly utilized by two windings without any significant electrical interaction between the windings. Thus, the present invention significantly improves the utilization of the magnetic cores of the conventional PFC rectifier shown in FIG. 3 and increases its power density. In one exemplary embodiment, the first and second magnetic cores comprise two identical toroidal magnetic cores. The converters used in the PFC circuit of the present invention can also be a combination of boost and buck converters as further described below.

Figure 6:
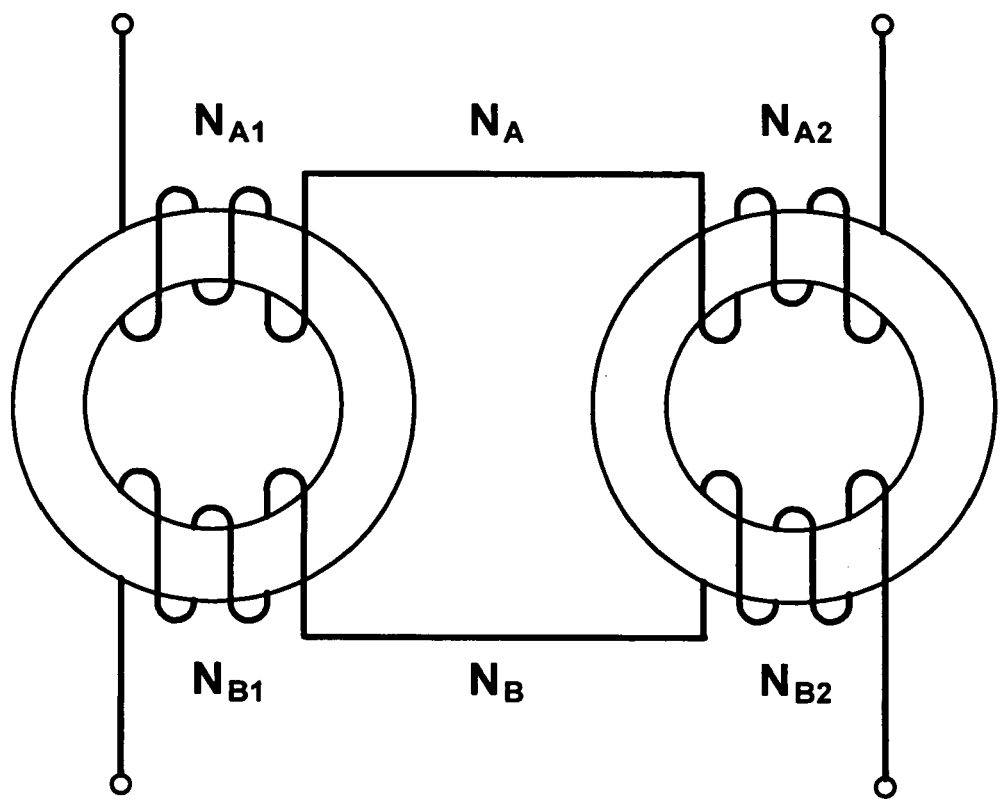
FIG. 6 shows a multi-port electromagnetic device having two serially coupled windings.

FIG. 6 shows an exemplary embodiment of the multi-port electromagnetic device that is used in the PFC rectifier of the present invention. As shown, the multi-port electromagnetic device of FIG. 6 comprises two magnetic cores, i.e., a first core and second core, and two windings, i.e. a, first winding and a second winding. The first and second magnetic cores each have their respective first and second closes flux paths.

Figure 7:
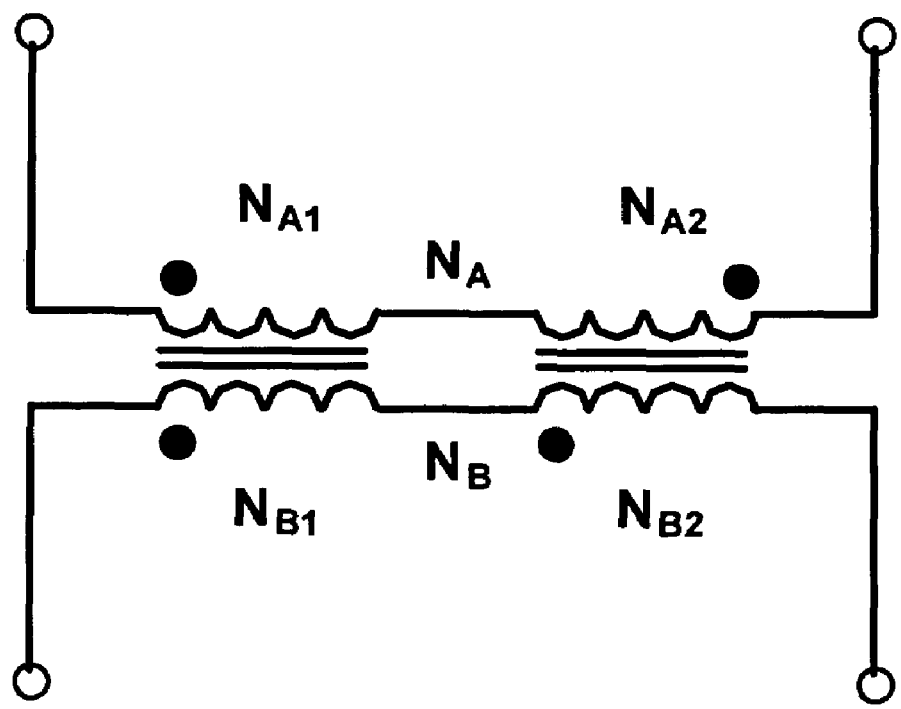
FIG. 7 shows a simplified symbol of the multi-port electromagnetic device of FIG. 6.

In this embodiment, the first winding $N_A$ comprises series connected windings $N_{A1}$ and $N_{A2}$. The second winding $N_B$ comprises series connected windings $N_{B1}$ and $N_{B2}$. Windings $N_{A1}$, and $N_{B1}$ are wound on the first core such that they have the same direction, however the windings $N_{A2}$ and $N_{B2}$ are wound on the second core such that they have an opposite direction relative to each other. FIG. 7 shows the simplified symbol for the multi-port electromagnetic device of FIG. 6 with polarity marks for each winding.

Figure 8:
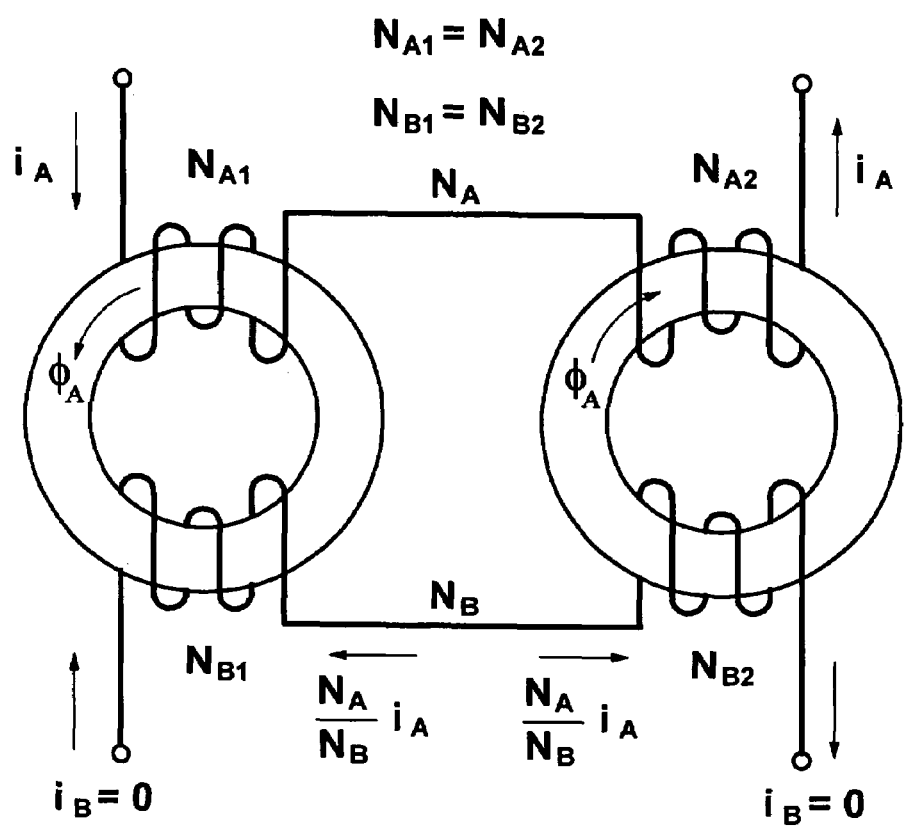
FIG. 8 shows the multi-port electromagnetic device of FIG. 6 with one reference directions for current and magnetic flux.

FIG. 8 shows the multi-port electromagnetic device of FIG. 6 with reference directions of currents and the closed magnetic flux $\phi_A$ as current $i_A$ flows through windings $N_{A1}$ and $N_{A2}$. Preferably, the winding $N_{A1}$, and winding $N_{A2}$ have an equal number of turns, i.e., $N_{A1}=N_{A2}$, and the winding $N_{B1}$ and winding $N_{B2}$ have an equal number of turns, i.e., $N_{B1}=N_{B2}$. As can be seen in FIG. 8, the variation of current $i_A$ generates the closed magnetic flux $\phi_A=N_A x i_A$ in each core. The variation of flux $\phi_A$ induces the current $i_B$ in windings $N_{B1}$ and $N_{B2}$ in each core. Because of the opposite winding directions and the equal number of turns of $N_{B1}$ and $N_{B2}$, the induced currents in windings $N_{B1}$ and $N_{B2}$ have opposite directions and equal magnitudes. As a result, the total current of winding $N_{B1}$-$N_{B2}$ is always zero, i.e., $i_B=0$. Thus, application of current in the first winding $N_A$ does not induce current change and consequently a substantial voltage in the second winding $N_B$.

Figure 9:
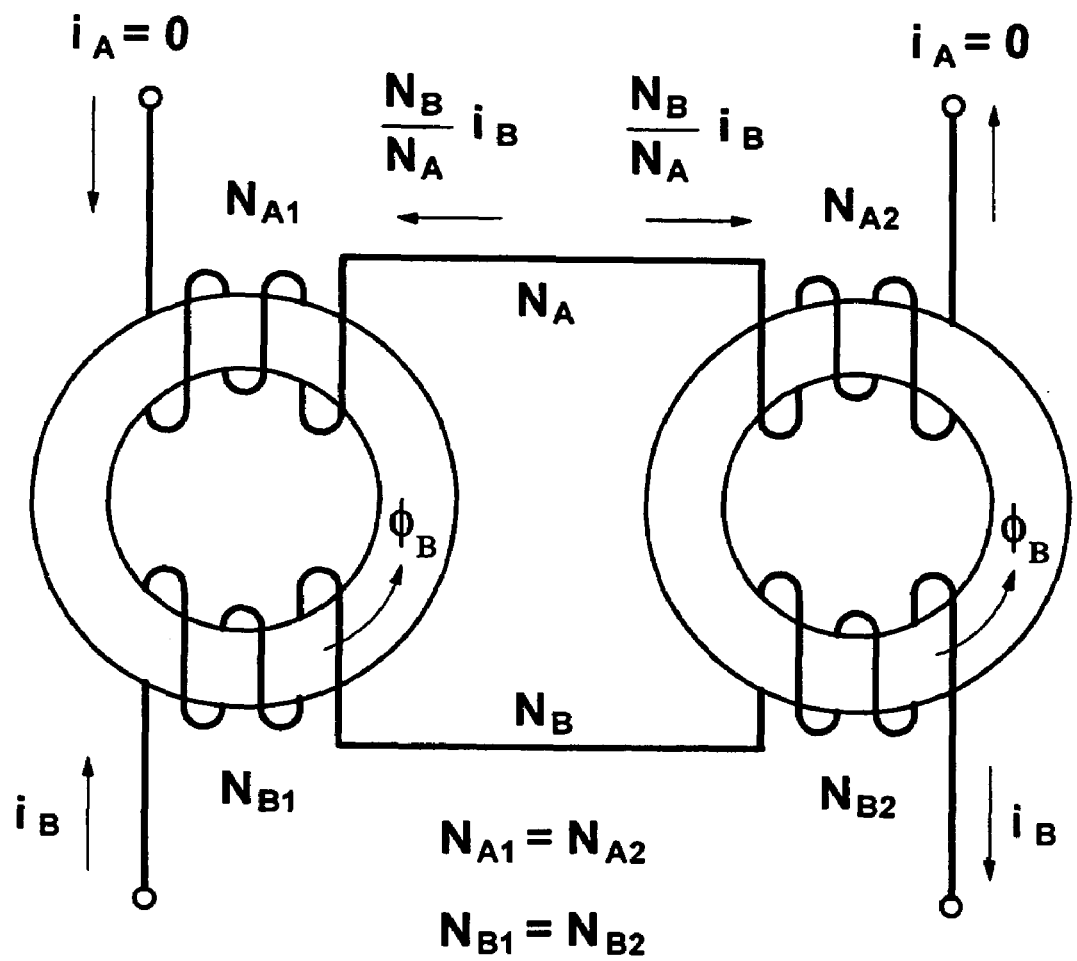
FIG. 9 shows the multi-port electromagnetic device of FIG. 6 with another reference directions for current and magnetic flux.

FIG. 9 shows the multi-port electromagnetic device of FIG. 6 with reference directions of currents and magnetic fluxes when current $i_B$ flows through the second windings $N_{B1}$ and $N_{B2}$. The variation of current $i_B$ generates magnetic flux $\phi_B=N_B X i_B$ in the first and second cores. The variation of flux $\phi_B$ induces the current in windings $N_{A1}$ and $N_{A2}$ in each of the first and second magnet cores. Because of the opposite winding directions and the equal number of turns, the induced currents in windings $N_{A1}$ and $N_{A2}$ are cancelled to be zero, i.e., $i_A=0$. Moreover, induced voltage $V_{NA}$ across the first winding is not influenced by current $i_B$ in the second winding, because voltage $V_{NA}$ is proportional to the varying rate of current $i_A$, which is zero. Thus, application of current in the second winding $N_B$ does not induce current change and consequently substantial voltage change in the first winding $N_A$. Accordingly, the first winding and the second windings $N_A$ and $N_B$ are magnetically independent of each other. As described later in more detail, the multi-port electromagnetic device of FIG. 6 is used to provide two independent inductive components for the PFC rectifier of the present invention.

Figure 10:
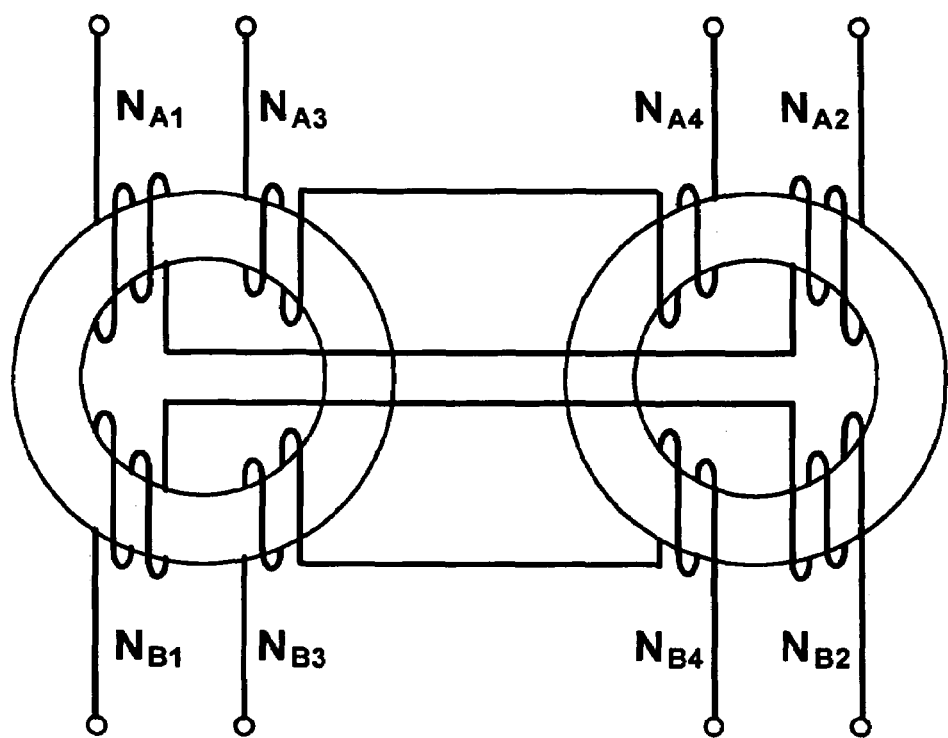
FIG. 10 shows a multi-port electromagnetic device having four serially coupled windings.

FIG. 10 shows a multi-port electromagnetic device having four-serially coupled windings. The first winding, which consists of serial windings $N_{A1}$ and $N_{A2}$, and the second winding, which consists of serial windings $N_{A3}$ and $N_{A4}$, form a first group of windings for this embodiment. The first group functions as a first transformer having a first primary winding and a first secondary winding. The third winding, which consists of serial windings $N_{B1}$ and $N_{B2}$, and the fourth winding, which consists of serial windings $N_{B3}$ and $N_{B4}$, form a second group of windings. The second group functions as a second transformer having a second primary winding and a second secondary winding. For the reasons stated above, the first transformer and the second transformer are magnetically independent of each other, thereby allowing the device of FIG. 10 to be used in applications that require independent transformers.

Figure 11:
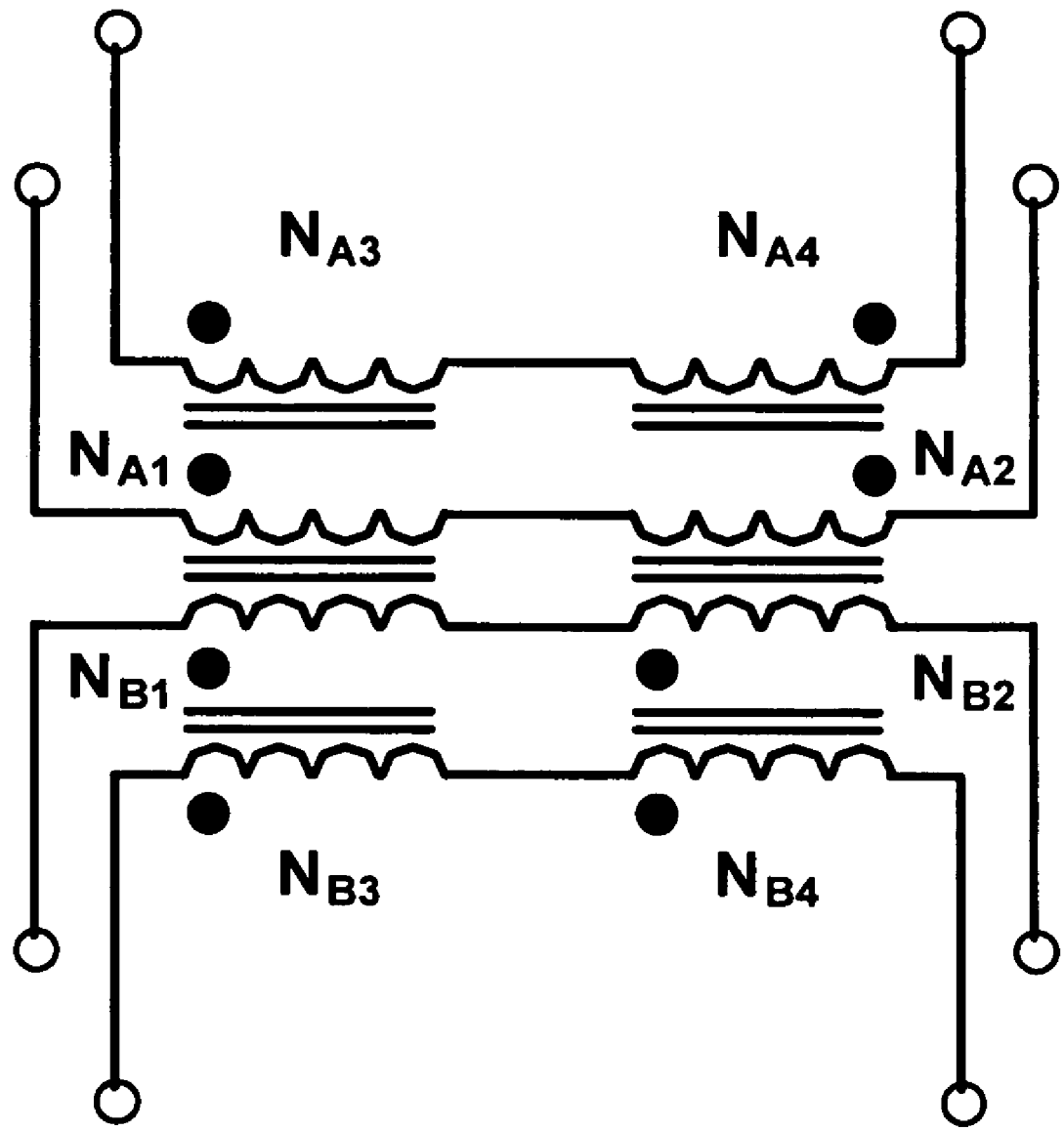
FIG. 11 shows the simplified symbol of the multi-port electromagnetic device of FIG. 10.
Figure 12:
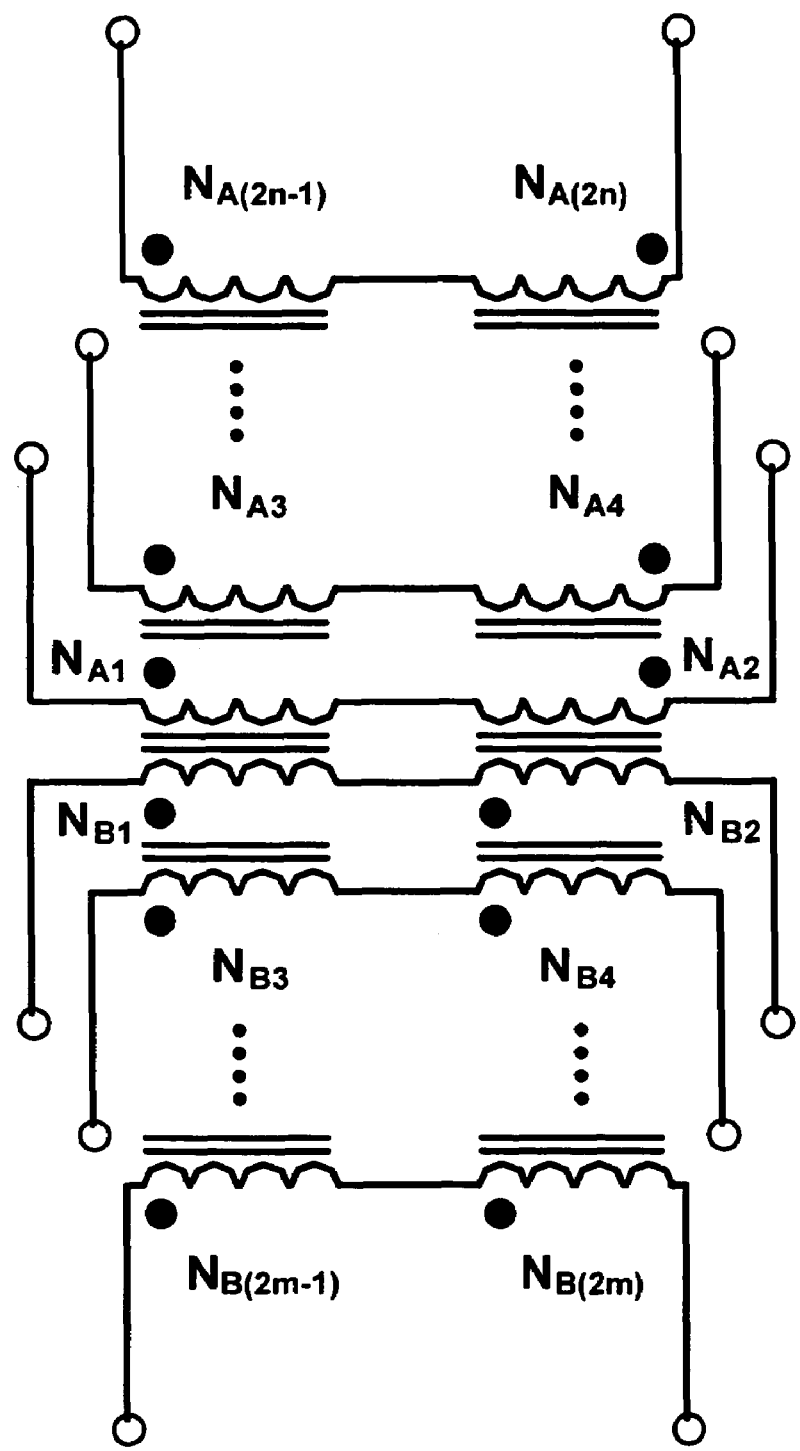
FIG. 12 shows the simplified symbol of a multi-port electromagnetic device having m+n serially coupled windings.

FIG. 11 shows the simplified symbol of the multi-port electromagnetic device of FIG. 10. FIG. 12 shows the simplified symbol of the multi-port electromagnetic device of FIG. 10 having m+n serial windings, where m and n can be any integers. The n number of windings in the first group functions as an n-winding transformer, while the m number of windings in the second group functions as another independent m-winding transformer. In an exemplary application, this embodiment of the invention can be used for providing a compact arrangement for multiple independent transformers in the PFC rectifier of the present invention.

Figure 13:
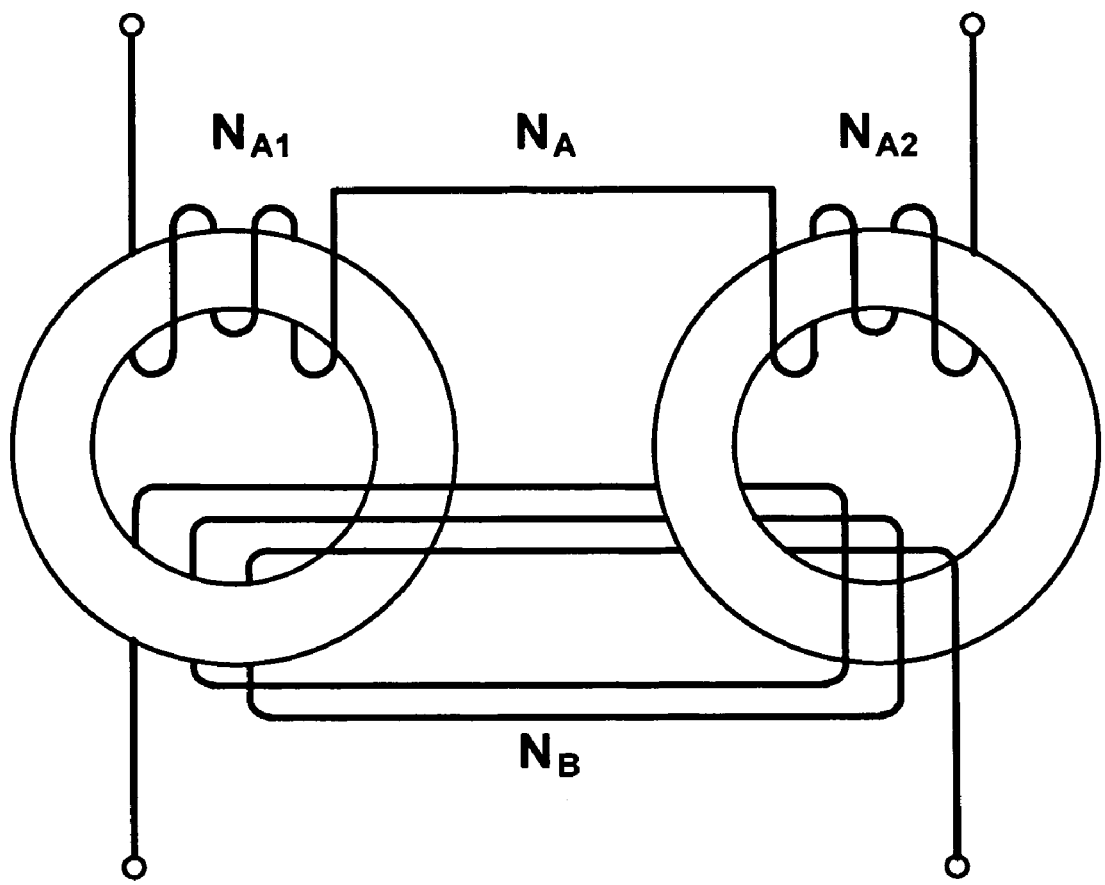
FIG. 13 shows a multi-port electromagnetic device having a serially coupled winding and a parallel winding.
Figure 14:
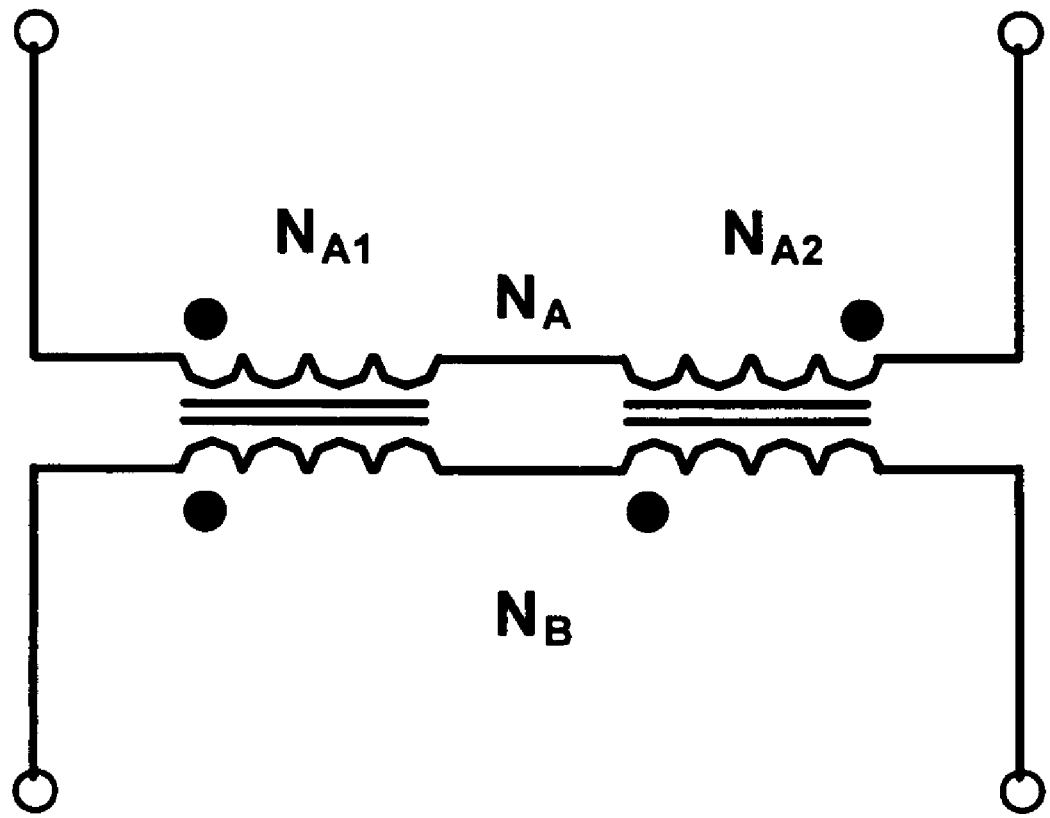
FIG. 14 shows the simplified symbol of the multi-port electromagnetic device of FIG. 13.

Another embodiment of the multi-port magnetic elements is shown in FIG. 13. This embodiment comprises a first winding $N_A$, a second winding $N_B$, and a first magnetic core and a second magnetic core. The first winding $N_A$ consists of series connected windings $N_{A1}$, and $N_{A2}$. However, the second winding $N_B$ is wound on the two magnetic cores in parallel (as opposed to series) as shown in FIG. 13. As can be seen, the winding $N_{A1}$ is wound on the first core in the same direction as the second winding $N_B$. However, the winding $N_{A2}$ is wound on the second core in the opposite direction of the second winding $N_B$ to provide for current cancellation as described above. FIG. 14 shows the simplified symbol of the multi-port magnetic device of FIG. 13.

Figure 15:
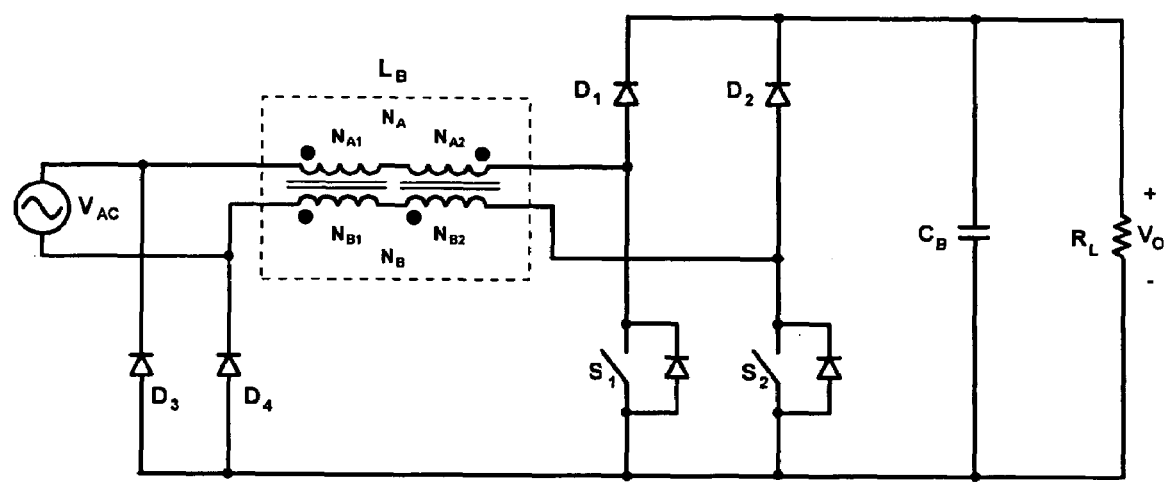
FIG. 15 shows a PFC rectifier according to one embodiment of the present invention.

FIG. 15 shows a PFC rectifier according to the present invention. The PFC rectifier includes a first boost converter connected to a first terminal of the ac input voltage source and a second boost converter connected to a second terminal of the ac input voltage source. Each boost converter operates during one half line cycle of the ac input voltage. The first boost converter consists of switch $S_1$, diode $D_1$ and $D_4$, and a first inductive component comprising the first winding $N_{A1}$, and $N_{A2}$ of the multi-port electromagnetic device of FIG. 6. The second boost converter consists of switch $S_2$, diode $D_2$ and $D_3$, and a second inductive component comprising the second winding $N_{B1}$ and $N_{B2}$ of the multi-port electromagnetic device of FIG. 6. In this way, the present invention uses the multi-port magnetic device of FIG. 6 to integrate the inductive components of the boost converters of the PFC rectifier of FIG. 15.

Figure 16:
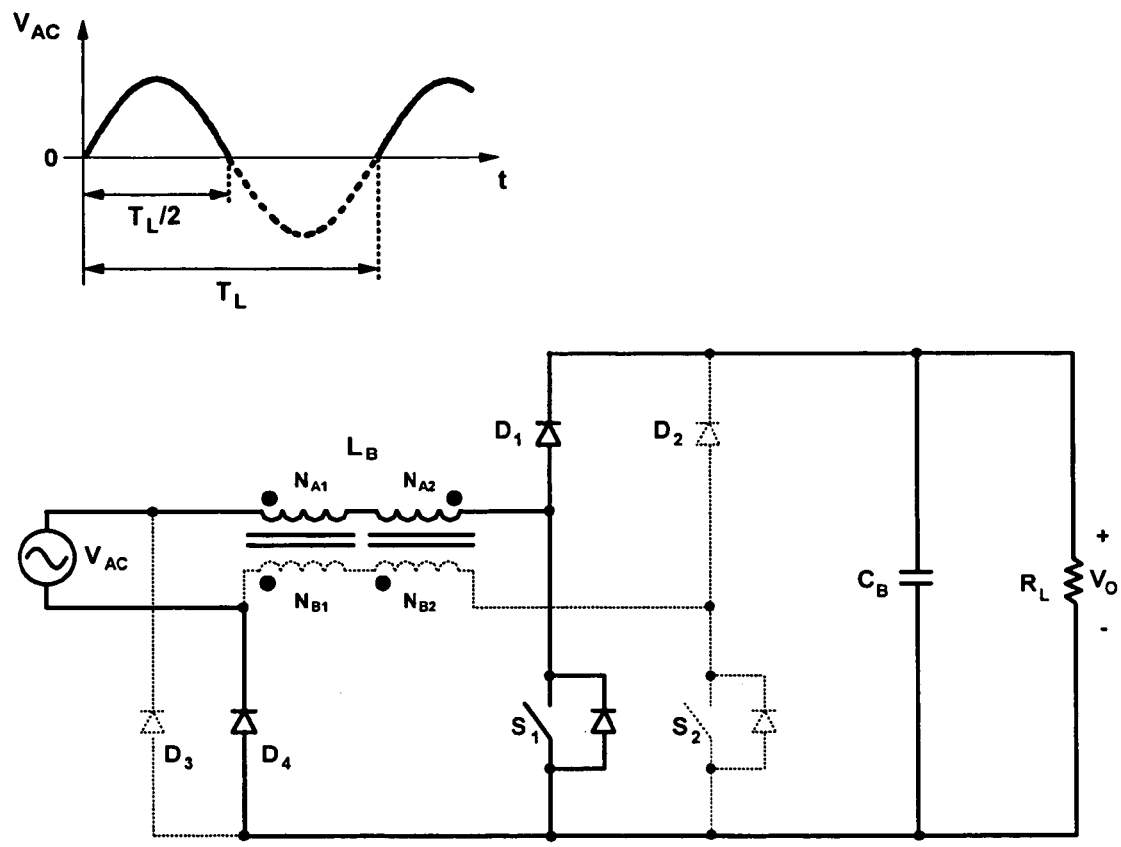
FIG. 16 highlights the operation of the PFC rectifier of FIG. 15 operating during the period when the line voltage is positive.
Figure 17:
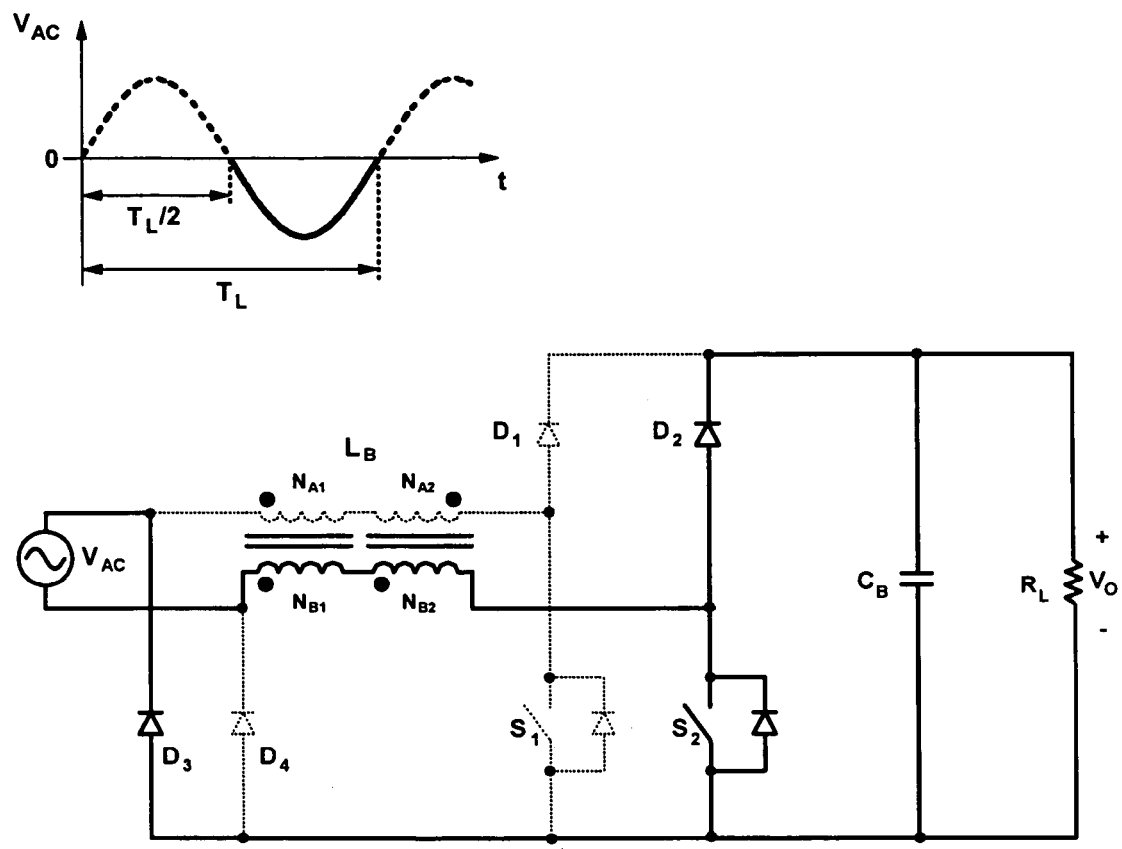
FIG. 17 highlights the operation of the PFC rectifier of FIG. 15 operating during the period when the line voltage is negative.

As shown in FIG. 16, during the period when ac input voltage $V_{AC}$ is positive, the first boost converter operates to deliver energy to the output while the second boost converter is idle. As a result, the two cores on which windings $N_{A1}$ and $N_{A2}$ are wound are fully utilized although windings $N_{B1}$ and $N_{B2}$ are idle. During the period when ac input voltage $V_{AC}$ is negative as shown in FIG. 17, the second boost converter operates to deliver energy to the output while the first boost converter is idle. As a result, the two cores are still fully utilized by windings $N_{B1}$ and $N_{B2}$ although windings $N_{A1}$ and $N_{A2}$ are idle. As a result, the high utilization of the magnetic cores significantly improves power density and reduces the overall weigh of the power supply. Although, the multi-port electromagnetic device of FIG. 6 is shown in the exemplary embodiment of FIG. 15, the multi-port electromagnetic device of FIG. 13 can also be used instead for integrating the inductive components of the PFC circuit of the present invention.

Figure 18:
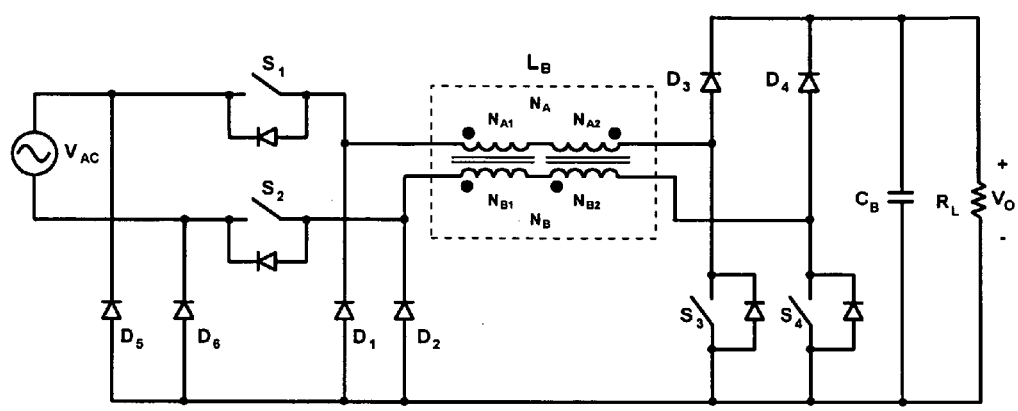
FIG. 18 shows a PFC rectifier having a cascaded buck-boost converter configuration according to another embodiment of the present invention.

FIG. 18 shows the multi-port electromagnetic device shown in FIG. 6 being employed in a PFC circuit having a dual cascaded buck and boost converter configuration. During the period when ac input voltage $V_{AC}$ is positive and greater than output voltage $V_o$, a first buck converter, which consists of switch $S_1$, diodes $D_1$ and $D_6$, and windings $N_{A1}$ and $N_{A2}$, operates to deliver energy to the output through diode $D_3$. As a result, the two cores are fully utilized by windings $N_{A1}$ and $N_{A2}$ to form a first buck inductor. During the period when ac input voltage $V_{AC}$ is positive and smaller than output voltage $V_o$, a first boost converter, which consists of switch $S_3$, diodes $D_3$ and $D_6$, and windings $N_{A1}$, and $N_{A2}$ operates to deliver energy to the output through switch $S_1$ that is continuously turned on during this period. Thus, the two cores are fully utilized by windings $N_{A1}$, and $N_{A2}$ to form a first boost inductor. During the period when ac input voltage $V_{AC}$ is negative and its magnitude is greater than output voltage $V_o$, a second buck converter that consists of switch $S_2$, diodes $D_2$ and $D_5$, and windings $N_{B1}$ and $N_{B2}$ operates to deliver energy to the output through diode $D_4$. In this way, the two cores are fully utilized by windings $N_{B1}$ and $N_{B2}$ to form a second buck inductor. During the period when ac input voltage $V_{AC}$ is negative and its magnitude is smaller than output voltage $V_o$, a second boost converter, which consists of switch $S_4$, diodes $D_4$ and $D_5$, and windings $N_{B1}$ and $N_{B2}$, operates to deliver energy to the output through switch $S_2$ that is continuously turned on during this period. Therefore, the two cores are fully utilized by windings $N_{B3}$ and $N_{B2}$ to form a second boost inductor.

Figure 19:
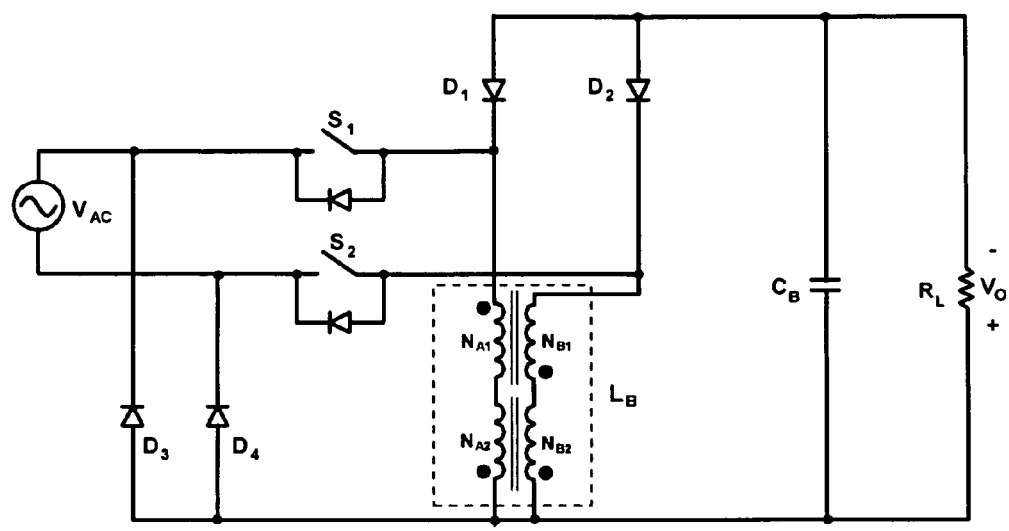
FIG. 19 shows a PFC rectifier having a buck-boost converter configuration according to yet another embodiment of the present invention.
Figure 20:
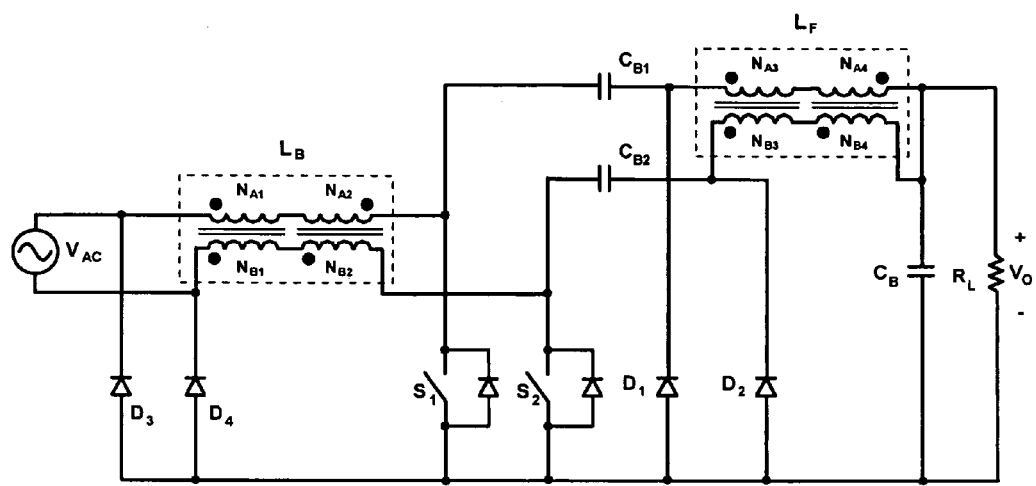
FIG. 20 shows a PFC rectifier having a CUK converter configuration according to still another embodiment of the present invention.
Figure 21:
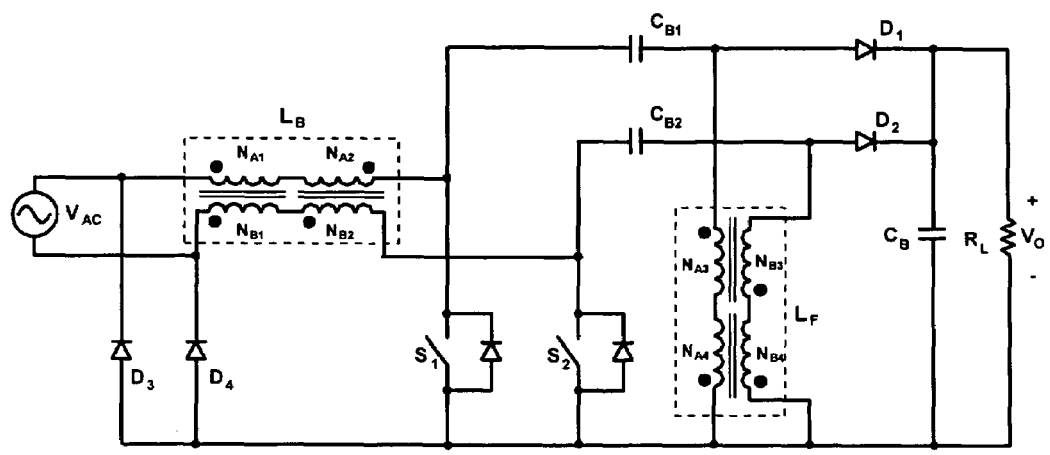
FIG. 21 shows a PFC rectifier having a SEPIC converter configuration according to another embodiment of the present invention.
Figure 22:
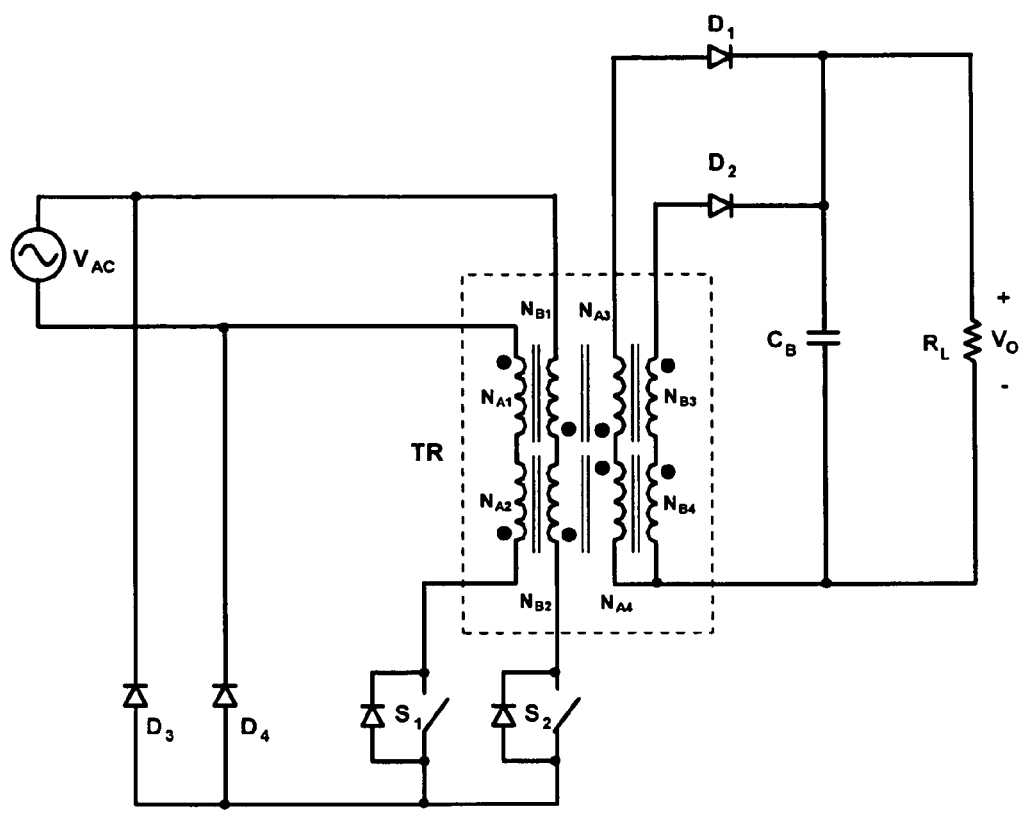
FIG. 22 shows a PFC rectifier having a flyback converter configuration according to yet another embodiment of the present invention.

FIG. 19 shows another application of the proposed technique in which the two-winding multi-port electromagnetic device is employed in a dual buck-boost converter. FIGS. 20 and 21 show another applications of the proposed technique in which the windings of the multi-port electromagnetic devices of FIG. 6 are employed in a dual CUK rectifier and a dual SEPIC rectifier, respectively. FIG. 22 shows another application of the proposed technique in which the four windings of the multi-port electromagnetic device shown in FIG. 10 are used in a dual isolated flyback rectifier.

Figure 23:
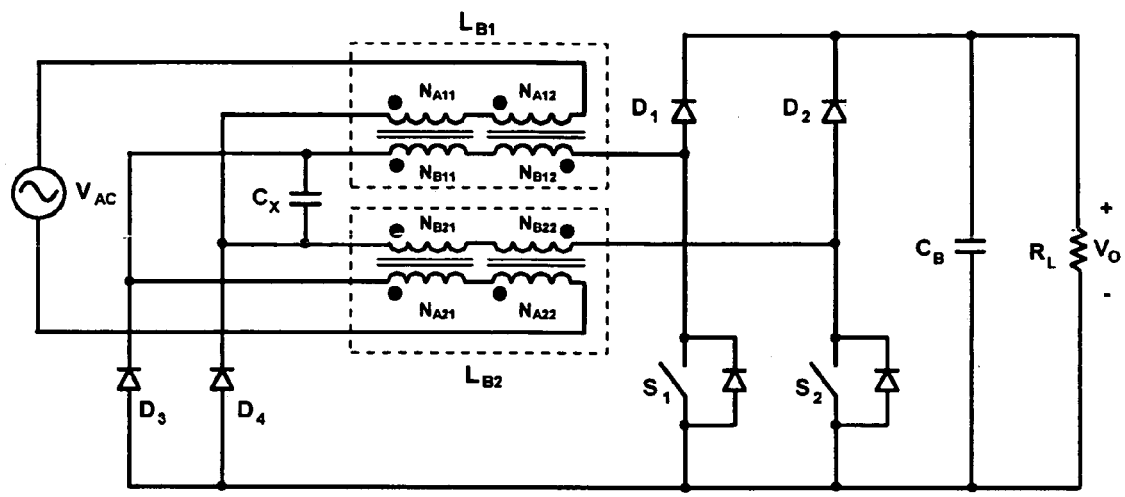
FIG. 23 shows a PFC rectifier having a differential mode filter inductor and boost inductor configuration according to still another embodiment of the present invention.

FIG. 23 shows another application of the proposed technique in which the four windings of the multi-port electromagnetic devices shown in FIG. 10 are employed in a dual boost converter with two differential-mode filters. As shown, each boost inductor is integrated to each differential-mode filter inductor.

Figure 24:
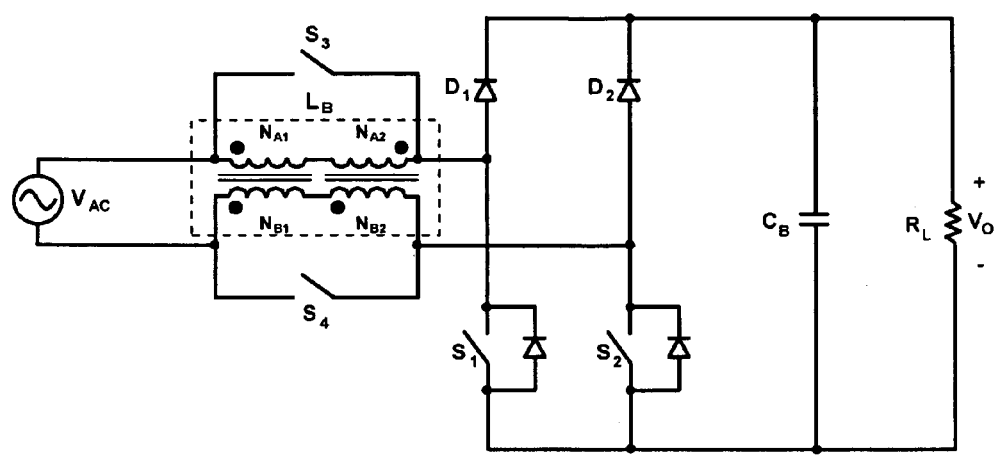
FIG. 24 shows a PFC rectifier having parallel switches of according to a further embodiment of the invention.
Figure 25:
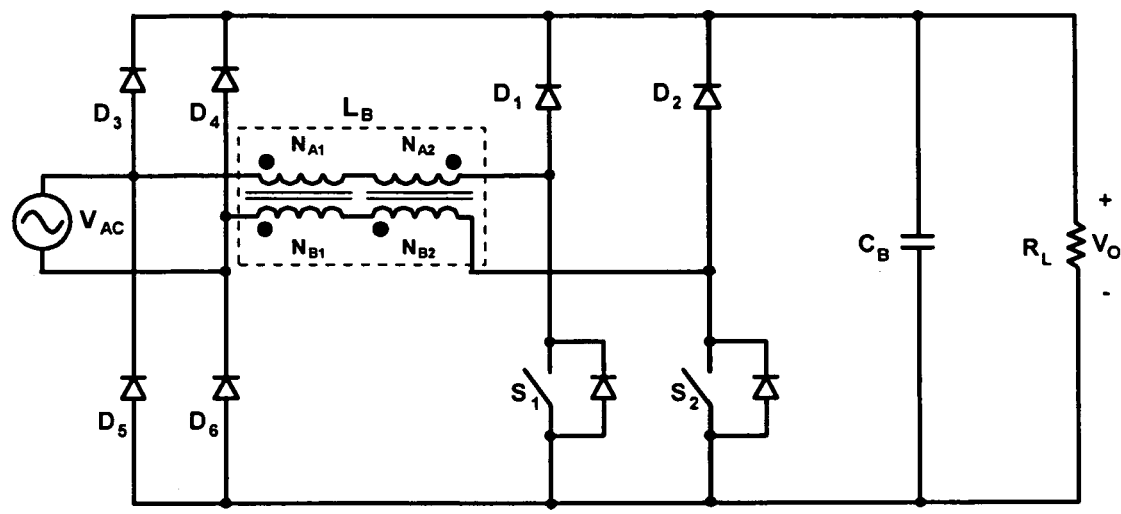
FIG. 25 shows a PFC rectifier having start-up diodes of according to still further embodiment of the invention.
Figure 26:
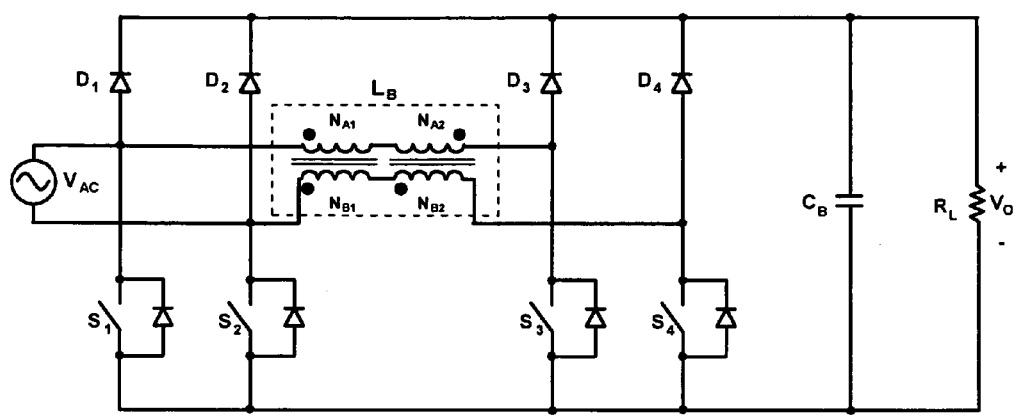
FIG. 26 shows a PFC rectifier having start-up diodes and synchronous rectifiers according to yet another embodiment of the invention.
Figure 27:
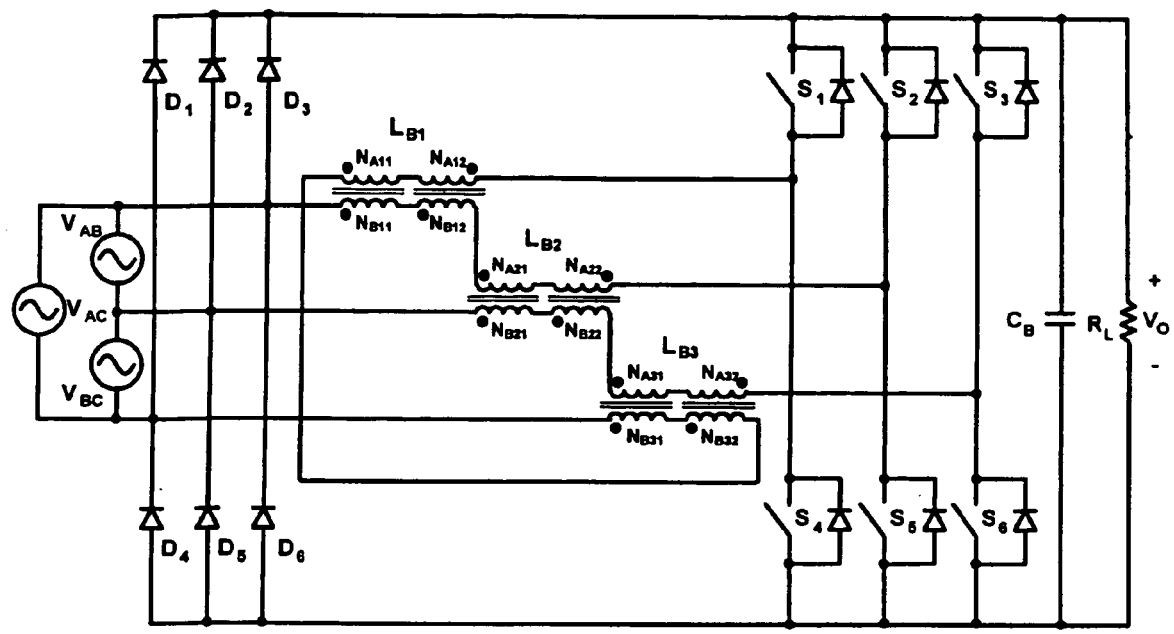
FIG. 27 shows a PFC rectifier having a differential mode filter inductor and boost inductor with three-phase six-switch boost rectifier according to another embodiment of the invention.

FIG. 24 shows the dual-boost converter with the windings of the multi-port electromagnetic device of FIG. 6 (or FIG. 13) and two parallel-connected switches. FIG. 25 shows the dual-boost converter with the multi-port electromagnetic device of FIG. 6 and two start-up diodes. FIG. 26 shows the dual-boost converter with the multi-port electromagnetic device of FIG. 6 and synchronous rectifier switches $S_1$ and $S_2$. Any diode of the circuits in this invention can be replaced by synchronous rectifier switches. Finally, FIG. 27 shows the three-phase six-switch PFC boost converter with three multi-port electromagnetic devices of FIG. 6.

The invention claimed is:

1. A PFC rectifier powered by an ac input voltage source having first and second half cycles, comprising:
a first converter having a first inductive element, said first converter operating during the first half cycle and remaining idle during the second half cycle;
a second converter having a second inductive element, said second converter operating during the second half cycle and remaining idle during the first half cycle;
a first magnetic core having a first closed flux path;
a second magnetic core having a second closed flux path, said first closed flux path being independent from the second closed flux path, wherein the first inductive element comprises a first winding that electromagnetically couples the first magnetic core to the second magnetic core, and the second inductive element comprises a second winding that electromagnetically couples the first magnetic core to the second magnetic core independent of the electromagnetic coupling of the first winding such that current application in the first winding during the first half cycle does not induce a substantial voltage in the second winding and current application in the second winding during the second half cycle does not induce a substantial voltage in the first winding.

2. The PFC rectifier of claim 1, wherein at least one of the first and second converters comprises a boost converter.

3. The PFC rectifier of claim 1, wherein at least one of the first and second converters comprises a buck converter.

4. The PFC rectifier of claim 1, wherein winding direction of one of the first winding or the second winding on one of the first magnetic core or second magnetic core is opposite to winding direction of the other one of the first winding or the second winding on the same one of the first magnetic core or second magnetic core.

5. The PFC rectifier of claim 1, wherein the first winding electromagnetically couples the first magnetic core to the second magnetic core serially and the second winding electromagnetically couples the first magnetic core to the second magnetic core serially.

6. The PFC rectifier of claim 1, wherein the first winding electromagnetically couples the first magnetic core to the second magnetic core serially and the second winding electromagnetically couples the first magnetic core to the second magnetic core in parallel.

7. The PFC rectifier of claim 1, wherein at least one of the first magnetic core and second magnetic core comprise toroidal magnetic core.

8. The PFC rectifier of claim 1, wherein the first magnetic core and said second magnetic core are substantially identical.

9. The PFC rectifier of claim 1, wherein the first winding and said second winding have substantially identical number of turns.

* * * * *